Sept. 30, 1952  N. S. REYNOLDS  2,612,420
PACKING CUP EXPANDER
Filed June 6, 1949
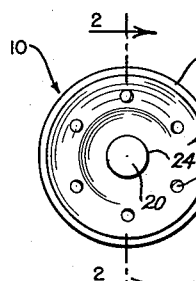
FIG.-1
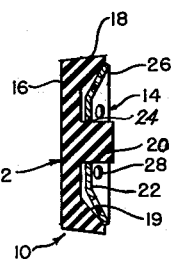
FIG.-2
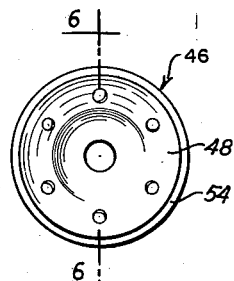
FIG.-5
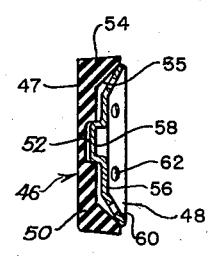
FIG.-6
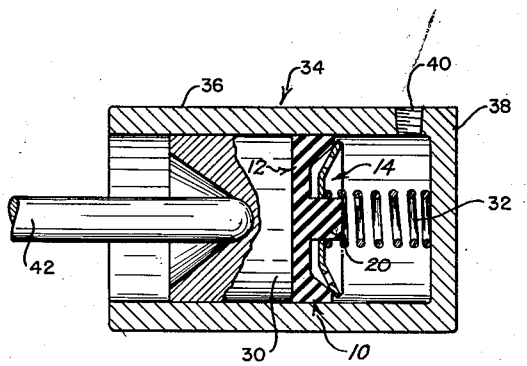
FIG.-3
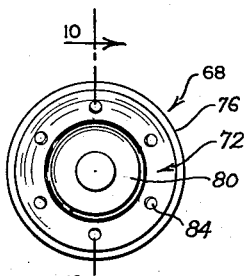
FIG.-9
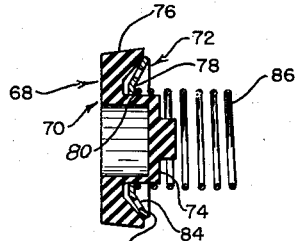
FIG.-10
FIG.-4
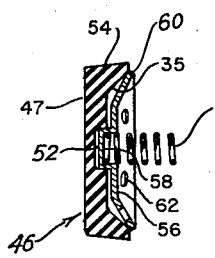
FIG.-7
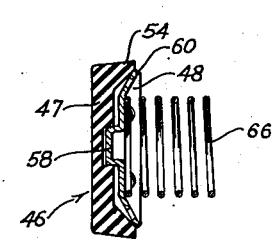
FIG.-8
INVENTOR.
Noel S. Reynolds
BY
Lamphere and Van Valkenburgh
ATTORNEYS Patented Sept. 30, 1952

2,612,420

UNITED STATES PATENT OFFICE 2,612,420

PACKING CUP EXPANDER

Noel S. Reynolds, St. Louis, Mo.

Application June 6, 1949, Serial No. 97,401

3 Claims. (Cl. 309—34)

The present invention relates generally to the piston art, and more particularly to expanding means for a flexible piston packing cup to maintain the sealing lip thereof in pressure engagement with the cylinder wall.

An object of the present invention is to provide a novel expander means for a piston packing cup which will maintain at all times a continuous outward directed pressure on the lip of the cup to maintain it against the inner wall of the cylinder.

Another object of the invention is to so construct and associate a piston packing cup and an expander for its sealing lip that the expander will be maintained in a concentric relation at all times, yet be free to have relative axial movement with respect to the piston so as to assure that there will be an even distribution of pressure to the sealing lip at all times and no possibility of the expander assuming a position which could result in damage to the wall of the cylinder in which the piston reciprocates.

Yet another object is to so construct a piston packing cup and an expander means for its sealing lip that cooperating means will be present, independently of the expanding engagement of the expander, which will prevent lateral shifting of the expander with respect to the cup axis and yet not interfere with the expanding action desired.

Further objects and advantages of the present invention will become apparent from the following description, reference being had to the accompanying drawing wherein several embodiments of the present invention are shown.

In the drawings:

Figure 1 is a front view of a piston packing cup and expander means constructed in accordance with the teachings of the present invention;

Figure 2 is a longitudinal sectional view of the cup and expander means of Figure 1, said view being taken on the line 2—2 of Figure 1;

Figure 3 is a longitudinal sectional view of the piston packing cup and expander means of Figures 1 and 2, shown in operative position in a cylinder and subject to action of a coiled spring;

Figure 4 is a longitudinal cross sectional view of a slightly modified piston packing cup structure permitting the expanding spring to be carried by the cup;

Figure 5 is a front elevational view of another modified form of piston packing cup and expander means;

Figure 6 is a sectional view of the modified form of Figure 5 taken on the line 6—6 in Figure 5;

Figure 7 is a view similar to Figure 6, showing a small diameter coiled spring for urging the expander element against the piston packing cup;

Figure 8 is similar to Figure 6, but shows a large diameter coiled spring for urging the expander element against the piston-packing cup;

Figure 9 is a front elevational view of still another modified form of piston packing cup and expander means; and Figure 10 is a longitudinal sectional view taken on the line 10—10 in Figure 9, with a coiled spring added.

Referring more particularly to the drawing by reference numerals, specifically Figures 1 through 3, 10 indicates generally an assembly embodying the teachings of the present invention which comprises a piston packing cup 12 and an expander element 14.

The piston packing cup 12 is made of resilient and flexible material such as rubber or synthetic rubber, having a flat base portion 16 and a sealing lip portion 18, the latter including an inner annular sloping surface 19. A short rod-like integral projection 20 extends forwardly the base portion 16 at the center thereof.

The expander element 14 is saucer shaped and made of a rigid material such as metal or plastic. The expander element has a base portion 22 containing a circular opening 24 in the center thereof for receiving the cup projection 20, and a rim portion 26 flares outwardly from the outer edge of the base portion 22. The rim of the expander is capable of engaging the inner edge of the cup lip and the flare is such that when engagement is present the base portion 22 will be spaced from the base portion of the cup. A series of spaced openings 28 are contained in the lip portion 26 to permit fluid to pass freely to the cup.

As shown in Figure 3, the assembly 10 is used with a piston 30 and a coiled spring 32 within a cylinder 34 having an end wall 38 and a side wall 36, the latter containing an opening 40 for the ingress and egress of actuating fluid from a suitable source (not shown). The coiled spring 32 is of a diameter so that one end can receive the cup projection 20 and abut the expander 14. Several convolutions of the spring 32 surround the projection 20 so that it is rigidly supported thereby. The other end of the spring engages the end wall of the cylinder, as illustrated, or some other suitable abutment which may be another piston if the cylinder is of the double piston type. When the assembly is made, the spring will be compressed by the member actuated by the piston which is shown as a pin for connecting the piston to a brake shoe of an hydraulic brake system, by way of example.

With the spring 32 compressed between the end wall 28 of the cylinder and the base portion 22 of the expander 14, the lip portion 26 of the expander element will be forced toward the base portion of the cup, thereby causing the flared rim portion 26 to force the lip 18 of the cup outwardly and against the inner surface of the cylinder wall 36. Thus, fluid in the cylinder 34 will be efficiently sealed off from any leakage past the lip of the packing cup.

When there is fluid under pressure in the cylinder to actuate the piston, it will be effective on the lip of the cup to produce a sealing action. The expander does not interfere with the fluid pressure action on the lip as the openings 28 permit fluid to flow past the expander element. Since the expander element is always being acted upon by a spring force, it will maintain the lip engaged with the cylinder wall, regardless of the fluid pressure. If the expander element were not present, the rubber cup in time would lose some of its resiliency and take a "set." Under such conditions leakage would take place as the lip would not maintain a pressure engagement with the cylinder wall at all times, especially when little or no fluid pressure was effective thereon. If the edge of the lip should become withdrawn only slightly from the cylinder wall, fluid would creep behind the edge and upon increase in fluid pressure this fluid would then be forced by the packing cup. With the expander element, as disclosed, acting to apply an outwardly directed force on the cup lip, there will be no possibility of fluid "creeping" past the lip with consequent leakage. Deterioration of the material of the cup will have no undesirable results.

One of the principal features of the expander element and the manner of its cooperation with the packing cup is that the expander element cannot shift laterally with respect to the cup and become tilted. The providing of the opening 24 in the center of the expander element and the mounting thereof on the axial projection 20 of the cup in a reasonably close sliding fit insures that the expander element will always remain centered in the cup. As a result, the expander element will apply a uniform outward force at all radial points of the lip. This uniform force results in better sliding movement on the cylinder wall and less tendency of the cup to stick, as would be possible if the outward force were not uniform. The uniform out force of the expander also does not cause any "lop sided" deforming of the cup with age, as would occur if the expander were not maintained centered and could become tilted. A further advantage in having the expander maintained centered in the cup is that it is prevented from dropping downward and dragging on the lower portion of the cylinder wall to cause scoring with consequent possibility of the cup failing to produce a good sealing action with the cylinder wall.

In some installations it may not be desirable, convenient or possible to position the expander element spring between the expander element and a cylinder end wall. In such cases the spring can be carried directly by the packing cup, as shown in Figure 4. In the structure illustrated, by way of example, the packing cup is constructed in the same manner as shown in Figures 1 to 3, with the exception that the axial projection 20 upon which the expander element 14 is mounted, has moulded therein a rigid member 43 extending slightly beyond the outer end of the projection. This extending end is provided with cross-slots 44 in its surface for attaching a C-washer 45 to act as an abutment for the outer end of the expander element spring 32'. This spring will be short, but have sufficient force when compressed between the expander element 14, mounted on the projection 20, and the C-washer to accomplish the forcing of the element toward the base portion 16 of the cup and result in the application of an outward force on the sealing lip 18 of the cup.

In Figures 5 to 8, inclusive, a modified form of assembly 46 comprising a packing cup 47 and an expander element 48 is shown. The cup 47 is made of a flexible and resilient material such as rubber or synthetic rubber and includes a base portion 50 having a circular cavity 52 formed in the center thereof, and a lip 54 having an annular inwardly sloping surface 55.

The expander element 48, which is made of a rigid material such as metal or plastic, includes a base portion 56 having a cup-shaped depression 58 in the center thereof and an annular rim portion 60 flaring outwardly from the outer edge of the base portion 56 as shown. A series of spaced openings 62 are provided in the rim portion 60. The expander element 48 is positioned adjacent the cup 46 so that the cup-shaped depression 58 is disposed in the cylindrical cavity 52, as shown in Figure 6, thereby centering the expander element and preventing it from tilting or having lateral movement to the axis of the cup 46.

With this construction different size coiled springs can be used to urge the flared rim 60 of the expander elements against the cup lip 54 in the same manner as described with reference to the assembly 10. A small coiled spring 64, the outer diameter of which is slightly less than the inner diameter of the depression 58, can be inserted in the latter as shown in Figure 7, or a large coiled spring 66, the outer diameter of which is equal to the diameter of the expander base portion 56, can be positioned as shown in Figure 8. When the larger spring is employed, the flared rim portion of the expander element prevents the end of the spring from shifting laterally. Both springs will have their outer ends engaging a cylinder end wall or other abutment.

Still another modified form of assembly 68 is shown in Figures 9 and 10. It comprises a cup 70 and an annular expander element 72. The cup 70, which is made of a resilient material such as rubber, is constructed in a manner as disclosed in my co-pending application Serial No. 26,409, now Patent No. 2,571,486 issued October 16, 1951 and includes a cup-shaped body portion 74 and a lip portion 76.

The annular expander element 72 is made of a rigid material such as metal or plastic and has a shape very similar to the expander element 14 already described. It includes a base portion 78 having a central opening 80 slightly larger than the outer diameter of the cup-shaped body portion 74 so as to be slidably received thereon as shown. The expander element has a rim portion 18 flared outwardly and provided with openings 84 through which fluid can pass to act on the cup. A coiled spring 86 has one end surrounding the cup-shaped body portion 74 and acting on the expander element, the other end of said spring abutting the end of the cylinder in which the piston, with which the cup will be associated, reciprocates.

The expander element and the packing cup structure of Figures 9 and 10 function in a manner already described to assure there will be a uniform outward force acting on the cup lip. The expander element is maintained centered on the cup by its mounting on the cup-shaped body portion of the packing cup which projects axially forward.

It is to be understood that the foregoing description of illustrated structures embodying my invention are only by way of example, and that changes and alterations in the disclosed structure, which will be readily apparent to one skilled in the art, are contemplated and intended to be within the scope of the invention.

What is claimed is:

1. In combination, a piston sealing member and expander element therefor comprising a unitary assembly for association with a piston in a manner separable therefrom by only a relative axial movement, and also for association with a cylinder and a spring member, said sealing member of the assembly comprising a single structure of yieldable material including an imperforate body to abut the piston head and an annular forwardly extending sealing lip for engaging the wall of the cylinder, and said expander element being constructed to have an annular portion with an outwardly flared surface for engaging the sealing member lip inwardly of the peripheral portion engageable with the cylinder, said expander element being mounted on the sealing member for relative axial movement toward the sealing member and the lip of the sealing member being constructed so that the flared surface of the expander element will have approximately line contact therewith inwardly of the lip sealing edge so that when axial force is applied to the expander element by a spring the expander element will apply maximum outwardly directed force on the lip edge, and means formed as a part of the flexible sealing member and upon which a part of the expander element is guided for preventing the expander element from shifting laterally with respect to the axis of the sealing member.

2. The structure of claim 1 wherein said last named means comprises an integral part extending axially forward from the body of the sealing member and a central opening in the expander element of such size to permit it to have a close sliding fit on the integral part.

3. The structure of claim 1 wherein said last named means comprises a central cylindrical recess in the face of the body of the sealing member and a central rearwardly extending part on the expander element for close sliding fit in the cylindrical recess.

NOEL S. REYNOLDS.

REFERENCES CITED

The following references are of record in the file of this patent:

UNITED STATES PATENTS

| Number | Name | Date |
|---|---|---|
| 1,595,610 | Maynard | Aug. 10, 1926 |
| 1,967,664 | Dick | July 24, 1934 |
| 2,059,729 | Dick | Nov. 3, 1936 |
| 2,093,062 | Watson | Sept. 14, 1937 |
| 2,197,125 | Cox | Apr. 16, 1940 |

FOREIGN PATENTS

| Number | Country | Date |
|---|---|---|
| 282,440 | Great Britain | Dec. 17, 1927 |